US011331791B2

(12) United States Patent
Zhao et al.

(10) Patent No.: US 11,331,791 B2
(45) Date of Patent: May 17, 2022

(54) 3 DEGREE-OF-FREEDOMS DECOUPLING SPHERICAL PARALLEL MECHANISM

(71) Applicant: SHENZHEN INSTITUTE OF ADVANCED TECHNOLOGY, Shenzhen (CN)

(72) Inventors: Guoru Zhao, Shenzhen (CN); Yongfeng Wang, Shenzhen (CN)

(73) Assignee: SHENZHEN INSTITUTE OF ADVANCED TECHNOLOGY, Shenzhen (CN)

( * ) Notice: Subject to any disclaimer, the term of this patent is extended or adjusted under 35 U.S.C. 154(b) by 561 days.

(21) Appl. No.: 16/479,918

(22) PCT Filed: Jun. 9, 2017

(86) PCT No.: PCT/CN2017/087680
§ 371 (c)(1),
(2) Date: Jul. 22, 2019

(87) PCT Pub. No.: WO2018/223363
PCT Pub. Date: Dec. 13, 2018

(65) Prior Publication Data
US 2019/0389054 A1 Dec. 26, 2019

(51) Int. Cl.
*B25J 17/02* (2006.01)
*B25J 9/08* (2006.01)
(Continued)

(52) U.S. Cl.
CPC .............. *B25J 9/08* (2013.01); *B25J 9/0009* (2013.01); *B25J 9/0045* (2013.01); *B25J 17/0283* (2013.01); *B25J 15/0033* (2013.01)

(58) Field of Classification Search
CPC ... B25J 9/009; B25J 9/0045; B25J 9/08; B25J 15/0033; B25J 17/0283
See application file for complete search history.

(56) References Cited

U.S. PATENT DOCUMENTS 6,026,703 A * 2/2000 Stanisic ............... B25J 17/0266
464/106
6,135,683 A 10/2000 Kim et al.
(Continued)

FOREIGN PATENT DOCUMENTS

CN 104023197 A 9/2014
CN 104827463 A 8/2015
(Continued)

OTHER PUBLICATIONS

International Search Report issued in corresponding International application No. PCT/CN2017/087680, dated Feb. 2018.

*Primary Examiner* — Dale Moyer

(57) ABSTRACT

A 3 DOFs decoupling spherical parallel mechanism provided by the present disclosure comprises: a fixed platform, a rotation assembly, a moving platform, a first arc kinematic chain, a second arc kinematic chain, a first arc rod, and a second arc rod. In the 3 DOFs decoupling spherical parallel mechanism, the rotation assembly can drive the moving platform to rotate by 360 degrees around a direction being perpendicular to the fixed platform, and the first arc rod and the second arc rod reciprocate along tangential directions of the first arc kinematic chain and of the second arc kinematic chain respectively to enable the moving platform to rotate around an axis of a plane where the first arc kinematic chain or the second arc kinematic chain is located. In this way, the rotations of the moving platform in three directions are respectively driven by driving units in three directions and being independent from each other, such that the three rotation actions of the mechanism have decoupling capability.

10 Claims, 2 Drawing Sheets

(51) Int. Cl.
   *B25J 9/00*   (2006.01)
   *B25J 15/00*  (2006.01)

(56) References Cited

U.S. PATENT DOCUMENTS

| | | | | |
|---|---|---|---|---|
| 2010/0206121 A1* | 8/2010 | Helmer | ............... | G06F 3/016 |
| | | | | 74/491 |
| 2011/0251624 A1* | 10/2011 | Yi | ............... | A61B 17/3403 |
| | | | | 606/130 |
| 2014/0151947 A1* | 6/2014 | Brown | ............... | B23Q 3/04 |
| | | | | 269/58 |
| 2020/0147786 A1* | 5/2020 | Zhao | ............... | B25J 9/0045 |

FOREIGN PATENT DOCUMENTS

| | | | |
|---|---|---|---|
| CN | 104889976 | A | 9/2015 |
| CN | 104985587 | A | 10/2015 |
| CN | 105538296 | A | 5/2016 |
| CN | 106426091 | A | 2/2017 |
| CN | 107160365 | A | 9/2017 |

* cited by examiner

3 DEGREE-OF-FREEDOMS DECOUPLING SPHERICAL PARALLEL MECHANISM

TECHNICAL FIELD

The present disclosure relates to the technical field of parallel mechanisms, and in particular, to a 3 degree-of-freedoms (DOFs) decoupling spherical parallel mechanism.

BACKGROUND

Since a parallel robot was first proposed in 1938, it has been widely used in various fields of society because of its characteristics such as large rigidity, strong bearing capacity, small error, high precision, small self-weight load ratio, good dynamic performance, easy control, and so on. At present, common parallel mechanisms include 2 DOFs, 3 DOFs, 4 DOFs, and 6 DOFs parallel mechanisms; currently, 3 DOF parallel mechanisms are the most researched and the most widely used type of less freedom parallel mechanisms. They can be classified into four categories according to the type of moving platform freedom: three-rotation parallel mechanisms, two-rotation and one-translation parallel mechanisms, one-rotation and two-translation parallel mechanisms, and three-translation parallel mechanisms. Wherein, spherical parallel mechanisms belong to three-rotation parallel mechanisms, which can realize any rotation around a spherical center of a movement spherical surface of a reference point of a moving platform. When such a mechanism moves, all points on a moving platform of the mechanism surround a spherical center and rotate in a fixed radius. Advantages of spherical parallel connection with respect to general parallel mechanisms are larger working space, flexibility, reliability, not being prone to interfere, etc.

For example, a bias output 3 DOFs spherical parallel mechanism with a central spherical hinge (CN101306534) proposed by Professor GAO, Feng et al. of Yanshan University has typical characteristics of a mechanism in a 3-RRR type. It realizes rotations in three directions around a fixed center.

Professor HUANG, Zhen of Yanshan University proposes a parallel mechanism with a symmetrical structure and without accompanying motion (CN102962840). It can continuously rotate around any axis or any point in the middle symmetrical plane of fixed and moving platforms, and thus can avoid occurrence of accompanying motions effectively.

SHEN, Long of Shanghai University proposes an antenna structure system with a spherical 3 DOFs parallel mechanism (CN101924266). It has larger working space in comparison with general 3 DOFs spherical mechanisms.

LIN, Rongfu et al. of Shanghai Jiao Tong University proposes a 3 DOFs spherical parallel mechanism with arc prismatic pairs (CN104827463). It adopts an arc prismatic pair manner to realize that rotations in three directions of a moving platform around a middle point of an arc.

Configurations of prismatic pairs of kinematic chains of these mechanisms generally include RR or RRR, and axes of these prismatic pairs intersect at one point to realize 3 DOFs motions of a moving platform. Wherein, LIN Rongfu of Shanghai Jiao Tong University adopts an arc prismatic pair, through an arc configuration of the prismatic pair, a moving platform is restricted by forces in three directions and can only rotate in three directions around a center of an arc, and thus does not have partial decoupling capability.

SUMMARY

In view of this, it is necessary to provide a 3 DOFs decoupling spherical parallel mechanism having motion decoupling capability.

A 3 DOFs decoupling spherical parallel mechanism comprises: a fixed platform, a rotation assembly mounted on the fixed platform, a moving platform spherically hinged with one end of the rotation assembly, a first arc kinematic chain and a second arc kinematic chain which are fixedly connected with a side of the rotation assembly, a first arc rod having one end received in an inner cavity formed by the first arc kinematic chain and being reciprocally movable along a tangential direction of the first arc kinematic chain, and a second arc rod having one end received in an inner cavity formed by the second arc kinematic chain and being reciprocally movable along a tangential direction of the second arc kinematic chain; wherein, both another end of the first arc rod and another end of the second arc rod are fixedly connected to a side edge of the moving platform, the rotation assembly can drive the moving platform to rotate by 360 degrees around a direction being perpendicular to the fixed platform; the first arc rod and the second arc rod reciprocate along tangential directions of the first arc kinematic chain and of the second arc kinematic chain respectively to enable the moving platform to rotate around an axis of a plane where the first arc kinematic chain or the second arc kinematic chain is located.

In some embodiments, the rotation assembly includes a first driving unit and a rotation unit, the first driving unit includes a first driving motor fixed on the fixed platform and a first driving gear fixedly connected with the first driving motor, the rotation unit includes a support fixed on the fixed platform and a rotation element sheathed on the support, the rotation element defines a first teeth profile engaging with the first driving gear, and one end of the rotation element is spherically hinged with the moving platform.

In some embodiments, axes of the first driving motor and of the support are parallel to each other.

In some embodiments, a restriction rod is arranged between the rotation element and the moving platform, the restriction rod has one end fixedly connected with the rotation element and another end spherically hinged with the moving platform through a spherical hinge.

In some embodiments, an included angle formed by the first arc kinematic chain and the second arc kinematic chain is 90 degrees.

In some embodiments, a second driving unit is mounted on a side of the first arc kinematic chain, the second driving unit includes a second driving motor fixed on a side of the first arc kinematic chain and a second driving gear fixedly connected with the second driving motor, and the first arc rod defines a second teeth profile engaging with the second driving gear.

In some embodiments, a third driving unit is mounted on a side of the second arc kinematic chain, the third driving unit includes a third driving motor fixed on a side of the second arc kinematic chain and a third driving gear fixedly connected with the third driving motor, and the second arc rod defines a third teeth profile engaging with the third driving gear.

In some embodiments, a first connection rod is arranged between the first arc rod and the moving platform, the first connection rod has one end passing through an aperture defined in an end of the first arc rod and another end fixedly connected to a side edge of the moving platform.

In some embodiments, a second connection rod is arranged between the second arc rod and the moving platform, the second connection rod has one end passing through an aperture defined in an end of the second arc rod and another end fixedly connected to a side edge of the moving platform.

In some embodiments, axes of the first connection rod and of the second connection rod pass through a center of the spherical hinge.

A 3 DOFs decoupling spherical parallel mechanism provided by the present disclosure comprises: a fixed platform, a rotation assembly mounted on the fixed platform, a moving platform spherically hinged with one end of the rotation assembly, a first arc kinematic chain and a second arc kinematic chain which are fixedly connected with a side of the rotation assembly, a first arc rod having one end received in an inner cavity formed by the first arc kinematic chain and being reciprocally movable along a tangential direction of the first arc kinematic chain, and a second arc rod having one end received in an inner cavity formed by the second arc kinematic chain and being reciprocally movable along a tangential direction of the second arc kinematic chain; wherein, both another end of the first arc rod and another end of the second arc rod are fixedly connected to a side edge of the moving platform. In the 3 DOFs decoupling spherical parallel mechanism, the rotation assembly can drive the moving platform to rotate by 360 degrees around a direction being perpendicular to the fixed platform; the first arc rod and the second arc rod reciprocate along tangential directions of the first arc kinematic chain and of the second arc kinematic chain respectively to enable the moving platform to rotate around an axis of a plane where the first arc kinematic chain or the second arc kinematic chain is located. In this way, the rotations of the moving platform in three directions are respectively driven by driving units in three directions and being independent from each other, such that the three rotation actions of the mechanism have decoupling capability.

DETAILED DESCRIPTION

In order to make the objects, technical solutions and advantages of the present invention be more clear, the present disclosure will be further described in detail below with reference to the accompanying drawings and embodiments. It should be understood that the specific embodiments described herein are merely intended to illustrate the present disclosure and are not intended to limit the present disclosure.

Figure 1:
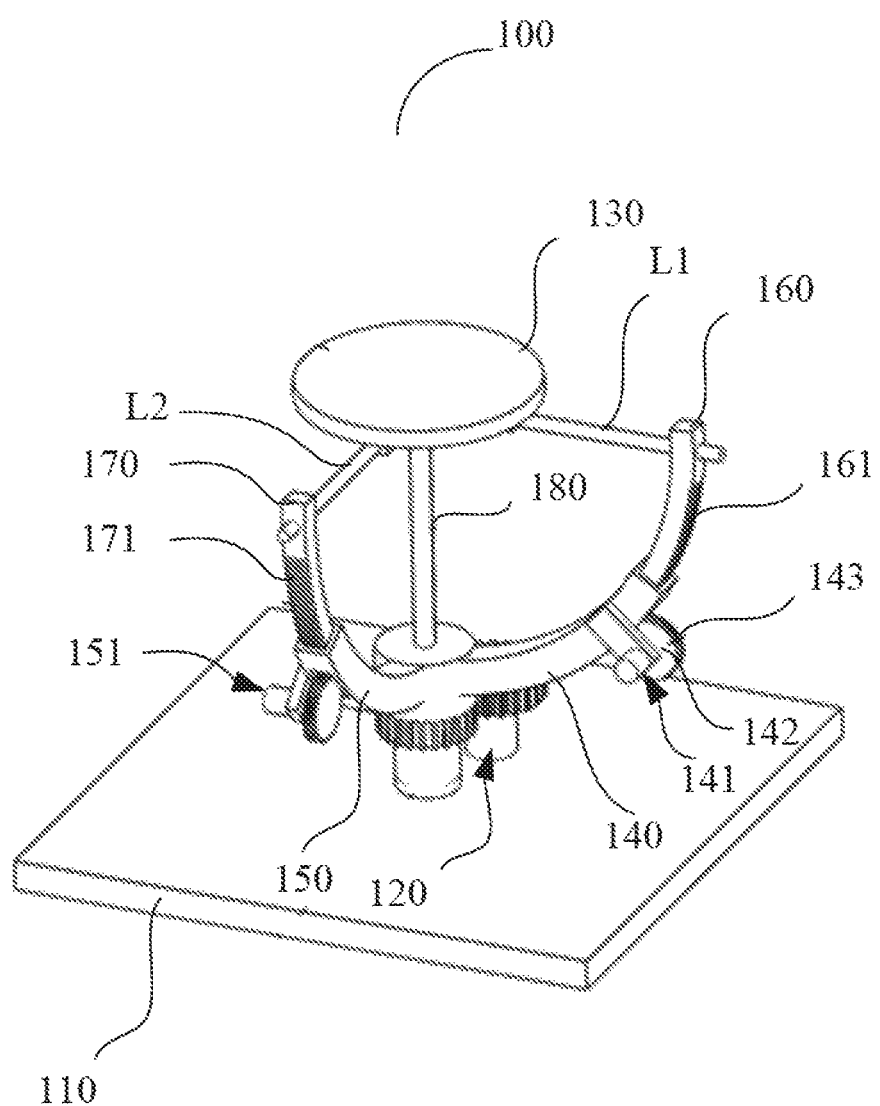
FIG. 1 is a structural schematic view of a 3 DOFs decoupling spherical parallel mechanism of one embodiment of the present disclosure.
Figure 2:
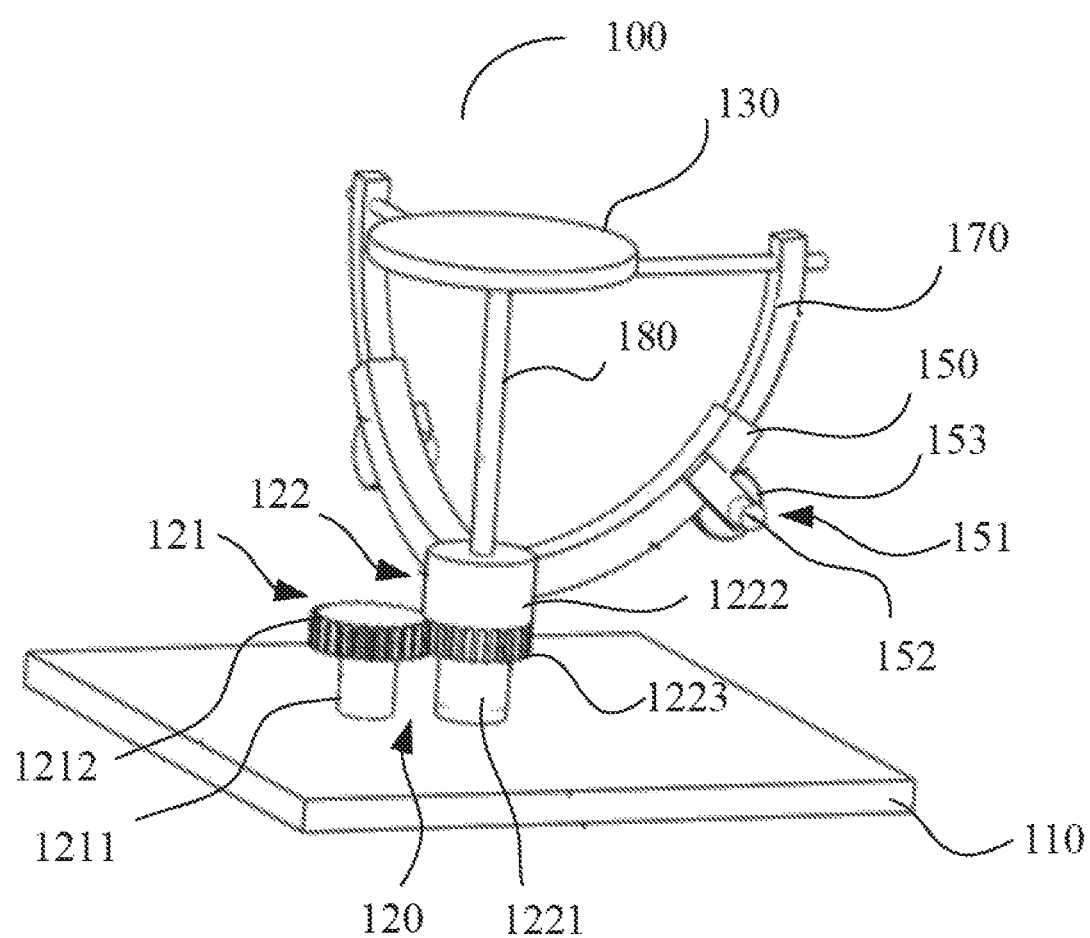
FIG. 2 is a structural schematic view of a 3 DOFs decoupling spherical parallel mechanism in another view angle of the present disclosure.

Referring to FIG. 1 and FIG. 2, a 3 DOFs decoupling spherical parallel mechanism 100 of one embodiment of the present disclosure comprises a fixed platform 110, a rotation assembly 120, a moving platform 130, a first arc kinematic chain 140, a second arc kinematic chain 150, a first arc rod 160, and a second arc rod 170.

Wherein, the rotation assembly 120 is mounted on the fixed platform 110; the moving platform 130 is spherically hinged with one end of the rotation assembly 120; the first arc kinematic chain 140 and the second arc kinematic chain 150 are fixedly connected with a side of the rotation assembly 120; one end of the first arc rod 160 is received in an inner cavity formed by the first arc kinematic chain 140, and the first arc rod 160 is reciprocally movable along a tangential direction of the first arc kinematic chain 140; one end of a second arc rod 170 is received in an inner cavity formed by the second arc kinematic chain 150, and the second arc rod 170 is reciprocally movable along a tangential direction of the second arc kinematic chain 170; both another end of the first arc rod 160 and another end of the second arc rod 170 are fixedly connected with a side edge of the moving platform 130.

It can be understood that, in the 3 DOFs decoupling spherical parallel mechanism 100 provided by the present disclosure, the rotation assembly 110 can drive the moving platform 130 to rotate by 360 degrees around a direction being perpendicular to the fixed platform 110, and the first arc rod 160 and the second arc rod 170 reciprocate along tangential directions of the first arc kinematic chain 140 and of the second arc kinematic drain 150 respectively to enable the moving platform 130 to rotate around an axis of a plane where the first arc kinematic drain 140 or the second arc kinematic chain 150 is located.

In a preferred embodiment of the present disclosure, the structure of the fixed platform 110 can be a square plate. It can be understood that the structure of the fixed platform 110 can be designed into a circular plate, a rectangular plate, or the like according to requirements.

In a preferred embodiment, the rotation assembly 120 includes a first driving unit 121 and a rotation unit 122, and the specific solution is as follows.

The first driving unit 121 includes a first driving motor 1211 fixed on the fixed platform 110 and a first driving gear 1212 fixedly connected with the first driving motor 1211.

The rotation unit 122 includes a support 1221 fixed on the fixed platform 110 and a rotation element 1222 sheathed on the support 1221, the rotation element 1222 defines a first teeth profile 1223 engaging with the first driving gear 1212, and one end of the rotation element 1222 is spherically hinged with the moving platform 130.

Preferably, axes of the first driving motor 1211 and of the support 1221 are parallel to each other.

Furthermore, a restriction rod 180 is arranged between the rotation element 1222 and the moving platform 130, the restriction rod 180 has one end fixedly connected with the rotation element 1222 and another end spherically hinged with the moving platform 130 through a spherical hinge (not shown).

It can be understood that, in the rotation assembly provided by the present disclosure, the first driving motor 1211 can drive the first driving gear 1212 to rotate, and the first driving gear 1212 drives the first teeth profile 1223 to rotate, such that the rotation element 1222 can rotate around the axis of the support 122.

In a preferred embodiment of the present disclosure, the structure of the moving platform 130 is a circular plate. It can be understood that the structure of the moving platform 130 can be designed into a square plate, a rectangular plate, or the like according to requirements.

In a preferred embodiment of the present disclosure, the first arc kinematic chain 140 can be an arc tubular structure. A cross section of the cavity of the first arc kinematic chain 140 can be a circular, oval, or square structure. A cross section of the first arc rod 160 can be a circular, oval, or square structure matching with the cavity structure of the first arc kinematic chain 140.

It can be understood that one end of the first arc rod 160 is received in an inner cavity formed by the first arc kinematic chain 140, and the first arc rod 160 is reciprocally movable along a tangential direction of the first arc kinematic chain 140, such that the moving platform 130 rotates around an axis of a plane where the first arc kinematic chain 140 is located.

In a preferred embodiment of the present disclosure, the second arc kinematic chain 150 can be an arc tubular structure. A cross section of the cavity of the second arc kinematic chain 150 can be a circular, oval, or square structure. A cross section of the second arc rod 170 can be a circular, oval, or square structure matching with the cavity structure of the second arc kinematic chain 150.

It can be understood that one end of the second arc rod 170 is received in an inner cavity formed by the second arc kinematic chain 150, and the second arc rod 170 is reciprocally movable along a tangential direction of the second arc kinematic chain 150, such that the moving platform 130 rotates around an axis of a plane where the second arc kinematic chain 160 is located.

In a preferred embodiment of the present disclosure, an included angle formed by the first arc kinematic chain 140 and the second arc kinematic chain 150 is 90 degrees.

In a preferred embodiment of the present disclosure, a second driving unit 141 can be mounted on a side of the first arc kinematic chain 140, the second driving unit 141 includes a second driving motor 142 fixed on a side of the first arc kinematic chain 140 and a second driving gear 143 fixedly connected with the second driving motor 142, and the first arc rod 160 defines a second teeth profile 161 engaging with the second driving gear 143. It can be understood that an output end of the second driving motor 142 is linked with the second driving gear 143 through a coupling, and a side of the first arc rod 160 defines a side gap, such that the second driving gear 143 can engage with the second teeth of the second teeth profile 161.

In a preferred embodiment of the present disclosure, a third driving unit 151 can be mounted on a side of the second arc kinematic chain 150, the third driving unit 151 includes a third driving motor 152 fixed on a side of the second arc kinematic chain 150 and a third driving gear 153 fixedly connected with the third driving motor 152, and the second arc rod 170 defines a third teeth profile 171 engaging with the third driving gear 153. It can be understood that an output end of the third driving motor 15 is linked with the third driving gear 153 through a coupling, and a side of the second arc rod 170 defines a side gap, such that the third driving gear 153 can engage with the third teeth of the third teeth profile 171.

It can be understood that the second driving motor 142 on the first arc kinematic chain 110 drives the second driving gear 143 to rotate, and thus drives the second teeth profile 161 defined on the first arc rod 160 and engaging with the second driving gear 143 to rotate, such that the first arc rod 160 reciprocates along an arc tangential direction in the cavity of the first arc kinematic chain 140, and thus the moving platform 130 can rotate around an axis passing through a center of the spherical hinge and being perpendicular to a plane where the first arc kinematic chain 140 is located (here, with respect to the second arc kinematic chain 150 and the second arc rod 170, there is a similar motion state, which is not repeated here).

In a preferred embodiment of the present disclosure, a first connection rod L1 is arranged between the first arc rod 60 and the moving platform 130, the first connection rod L1 has one end passing through an aperture defined in an end of the first arc rod 160 and another end fixedly connected to a side edge of the moving platform 130.

In a preferred embodiment of the present disclosure, a second connection rod L2 is arranged between the second arc rod 170 and the moving platform 130, the second connection rod L2 has one end passing through an aperture defined in an end of the second arc rod 170 and another end fixedly connected to a side edge of the moving platform 130.

In a preferred embodiment of the present disclosure, axes of the first connection rod L1 and of the second connection rod 12 pass through a center of the spherical hinge.

In the 3 DOFs decoupling spherical parallel mechanism 100 provided by the present disclosure, the rotation assembly 120 can drive the moving platform 130 to rotate by 360 degrees around a direction being perpendicular to the fixed platform 110; the first arc rod 160 and the second arc rod 170 reciprocate along tangential directions of the first arc kinematic chain 140 and of the second arc kinematic chain 150 respectively to enable the moving platform 130 to rotate around an axis of a plane where the first arc kinematic chain 140 or the second arc kinematic chain 150 is located. In this way, the rotations of the moving platform 130 in three directions are respectively driven by driving units in three directions and being independent from each other, such that the three rotation actions of the mechanism have decoupling capability.

The above 3 DOFs decoupling spherical parallel mechanism 100 has a simple and reliable structure, strong driving capability, high flexibility, and the movable platform 130 moving stably, and can be applied in fields such as virtual axis machine tools, industrial robots, aviation simulation equipments, medical equipments, etc.

The above is only preferred embodiments of the present disclosure, and it should be noted that those skilled in the art can also make some improvements and embellishments without departing from the principles of the present disclosure, and these improvements and embellishments should also be considered as the scope of protection of the present disclosure.

What is claimed is:

1. A 3 DOFs decoupling spherical parallel mechanism, comprising: a fixed platform, a rotation assembly mounted on the fixed platform, a moving platform spherically hinged with one end of the rotation assembly, a first arc kinematic chain and a second arc kinematic chain which are fixedly connected with a side of the rotation assembly, a first arc rod having one end received in an inner cavity formed by the first arc kinematic chain and being reciprocally movable along a tangential direction of the first arc kinematic chain, and a second arc rod having one end received in an inner cavity formed by the second arc kinematic chain and being reciprocally movable along a tangential direction of the second arc kinematic chain; wherein, both another end of the first arc rod and another end of the second arc rod are fixedly connected to a side edge of the moving platform, the rotation assembly is capable of driving the moving platform to rotate by 360 degrees around a direction being perpendicular to the fixed platform; the first arc rod and the second arc rod reciprocate along tangential directions of the first arc kinematic chain and of the second arc kinematic chain respectively to enable the moving platform to rotate around an axis of a plane where the first arc kinematic chain or the second arc kinematic chain is located.

2. The 3 DOFs decoupling spherical parallel mechanism according to claim 1, wherein, the rotation assembly includes a first driving unit and a rotation unit, the first driving unit includes a first driving motor fixed on the fixed platform and a first driving gear fixedly connected with the first driving motor, the rotation unit includes a support fixed on the fixed platform and a rotation element sheathed on the support, the rotation element defines a first teeth profile engaging with the first driving gear, and one end of the rotation element is spherically hinged with the moving platform.

3. The 3 DOFs decoupling spherical parallel mechanism according to claim 2, wherein, axes of the first driving motor and of the support are parallel to each other.

4. The 3 DOFs decoupling spherical parallel mechanism according to claim 3, wherein, a restriction rod is arranged between the rotation element and the moving platform, the restriction rod has one end fixedly connected with the rotation element and another end spherically hinged with the moving platform through a spherical hinge.

5. The 3 DOFs decoupling spherical parallel mechanism according to claim 4, wherein, a first connection rod is arranged between the first arc rod and the moving platform, the first connection rod has one end passing through an aperture defined in an end of the first arc rod and another end fixedly connected to a side edge of the moving platform.

6. The 3 DOFs decoupling spherical parallel mechanism according to claim 5, wherein, a second connection rod is arranged between the second arc rod and the moving platform, the second connection rod has one end passing through an aperture defined in an end of the second arc rod and another end fixedly connected to a side edge of the moving platform.

7. The 3 DOFs decoupling spherical parallel mechanism according to claim 6, wherein, axes of the first connection rod and of the second connection rod pass through a center of the spherical hinge.

8. The 3 DOFs decoupling spherical parallel mechanism according to claim 1, wherein, an included angle formed by the first arc kinematic chain and the second arc kinematic chain is 90 degrees.

9. The 3 DOFs decoupling spherical parallel mechanism according to claim 1, wherein, a second driving unit is mounted on a side of the first arc kinematic chain, the second driving unit includes a second driving motor fixed on a side of the first arc kinematic chain and a second driving gear fixedly connected with the second driving motor, and the first arc rod defines a second teeth profile engaging with the second driving gear.

10. The 3 DOFs decoupling spherical parallel mechanism according to claim 1, wherein, a third driving unit is mounted on a side of the second arc kinematic chain, the third driving unit includes a third driving motor fixed on a side of the second arc kinematic chain and a third driving gear fixedly connected with the third driving motor, and the second arc rod defines a third teeth profile engaging with the third driving gear.

* * * * *